Feb. 13, 1934.     A S. CHARLEBOIS     1,946,930

CULINARY UTENSIL

Original Filed June 25, 1931

INVENTOR,
Anna S Charlebois

Patented Feb. 13, 1934

1,946,930

UNITED STATES PATENT OFFICE 1,946,930

CULINARY UTENSIL

Anna S. Charlebois, Toronto, Ontario, Canada

Application June 25, 1931, Serial No. 546,721, and in Canada June 26, 1930. Renewed July 7, 1933

2 Claims. (Cl. 146—177)

The invention relates to improvements in culinary utensils as described in the present specification and shown in the accompanying drawing that forms a part of the same.

The objects of the invention are to provide a culinary utensil which ordinarily serves the purpose of a strainer, or grater, and which by a simple adjustment of parts is transformed into an efficient press for extracting the juices from fruits, or vegetables.

The invention consists in the novel features of construction, arrangements and combinations described in the present specification and more particularly pointed out in the claims for novelty following.

In the drawing Figure 1 is a vertical sectional view through my improved fruit and vegetable press, taken on the line 1—1 of Figure 2.

Like numerals of reference indicate corresponding parts in the various figures.

Figure 1:
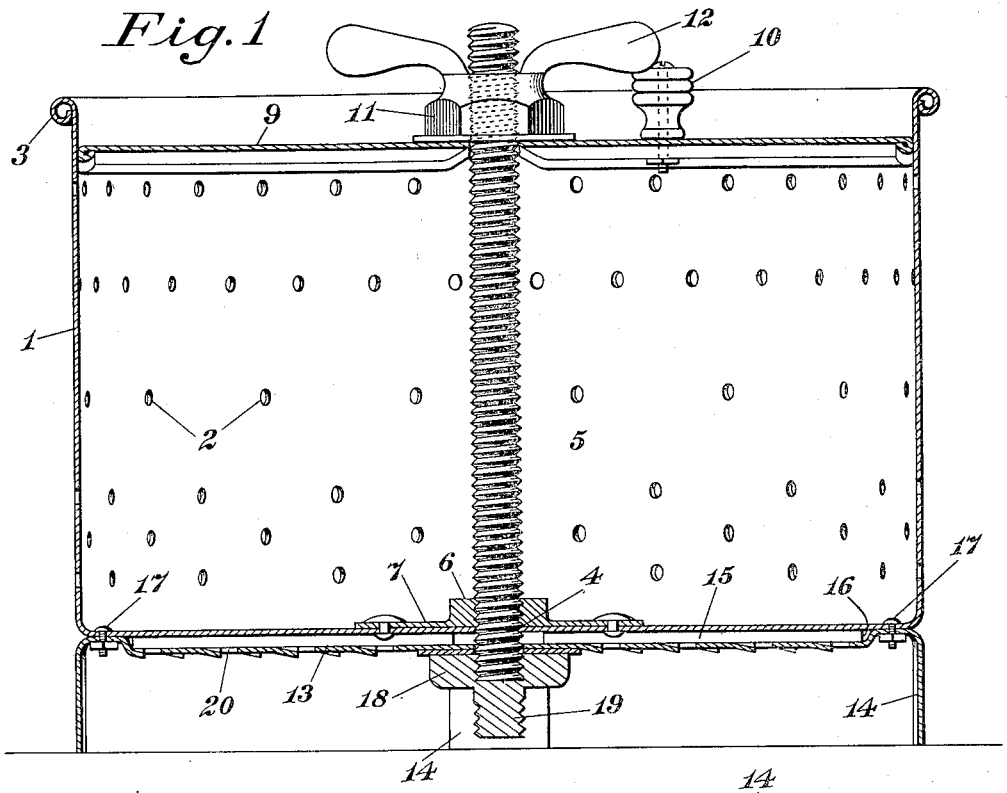
Figure 2:
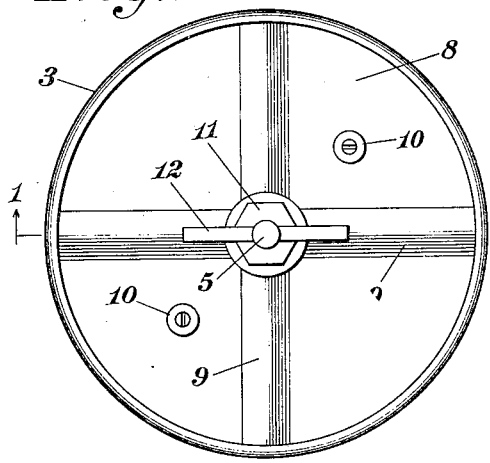
Figure 2 is a plan view of the structure shown in Figure 1.

Referring to the drawing the receptacle 1 adapted to accommodate the fruit or vegetables may be made of any desired material and is perforated throughout its entire surface, including the bottom, as indicated by the numeral 2. This receptacle is open at its top end and preferably has its top edge curled as at 3, to insure rigidity and is provided with a centrally located circular opening 4 through the bottom thereof to permit of the insertion of a screw 5 therethrough, which screw is of sufficient length to extend upwardly a short distance above the top edge of the receptacle.

An interiorly threaded nut 6 is secured on the inner face of the bottom of the receptacle in register with the opening 4 and through which the lower end of the screw 5 is adapted to extend, said nut preferably having an enlarged base 7 which serves to reinforce the bottom of the receptacle.

A cover 8 provided with suitable transverse reinforcing ribs 9 slides vertically within the receptacle 1 and is provided with a central opening through which the screw 5 extends, said cover being provided with suitable hand grips 10.

A nut 11 provided with suitable hand grips 12 threads over the screw 5 above the cover 8 and constitutes means for forcing said cover downwardly against the material in the receptacle.

13 is a removable base adapted to be secured to the bottom of the vessel 1, said base being cross shaped with each arm thereof extending to the edge of the vessel and then being turned outwardly at right angles to provide legs 14 adapted to support the device above the object on which it rests so as to permit of the liquid passing through the perforations in the bottom of the vessel, said arms being provided with sides 15 turned inwardly against the bottom of the vessel and terminating short of the outer edge of the vessel as at 16 to permit of said arms being turned upwardly against said bottom for the reception of suitable removable fastening elements 17. The base 13 is also provided with a central opening through which the lower end of the screw 5 projects.

A nut 18 threads over the lower end of the screw 5 into engagement with the under side of the base 13 and this nut cooperates with the interior nut 6, to hold said screw rigidly to its vertical position, the said base also serving as a reinforcement for the bottom of the vessel.

The nut 18 is provided on its under face with an externally threaded plug 19 adapted, when the screw 5 and the base 13 are removed, to be screwed upwardly into the nut 6 to close the opening therethrough and thus permit of the vessel 1 being used as a strainer.

Figure 3:
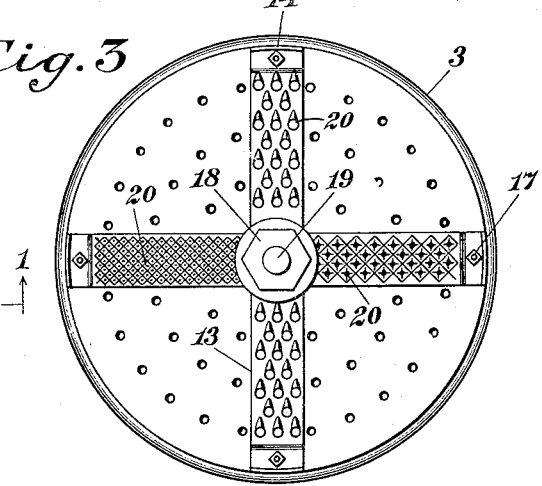
Figure 3 is a view of the under side of the structure shown in Figure 1.
Figure 4:
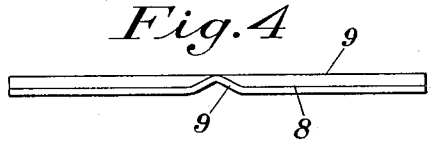
Figure 4 is an edge view of the cover.
Figure 5:
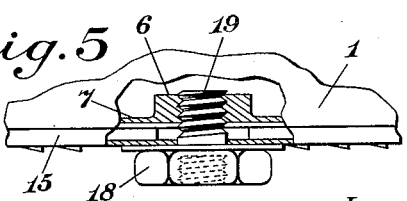
Figure 5 is a fragmentary view with a portion of the side wall broken away and the bottom in vertical section to show the lower retaining nut used as a stopper when the device is used as a strainer only.

The exposed flat surfaces of arms of the base 13 are serrated, or otherwise roughened, as at 20 so that said arms may be used as graters and if desirable the serrations of each individual arm may be of a different degree of coarseness, or shape as illustrated in Figure 3, thus rendering the device adaptable for grating different articles or paring potatoes, apples or the like.

In the use of this invention as a press, the fruit, or vegetables from which the juice is to be extracted is placed in the receptacle 1 around the screw 5 and the cover 8 is then placed in position and is screwed downwardly to compress the contents by means of the nut 11, forcing the juice through the perforations in the vessel.

When the device is used simply as a strainer the screw 5 may be removed, and also the base 13 if so desired, and the nut 18 reversed so that the plug 19 thereof will close the opening through the nut 6.

The base 13 when detached from the vessel may be used as a grater, and may be supported on one or other of the legs 14.

What I claim is:—

1. In a culinary utensil, in combination, a vessel having perforations throughout its surface, a substantially cross-shaped base removably secured to the bottom of said vessel, the arms of said base being serrated to provide grating surfaces, an upright worm shaft positioned centrally within said vessel and extending through the bottom thereof and through said base, a retaining nut secured on the inner face of said bottom and receiving said worm shaft, a nut having an internally threaded recess adapted to receive the lower end of said screw, said nut also having an exteriorly threaded plug adapted on the removal of said worm to be threaded into said retaining nut, a cover slidable vertically on said worm, and a pressure nut operating on said worm above said cover.

2. In a culinary utensil, in combination, a vessel perforated throughout its side and bottom walls, a substantially cross-shaped element removably secured to the bottom of said vessel and having the ends thereof turned inwardly to provide supporting legs, the arms of said element being substantially U shape in cross section and being serrated on their plane surfaces, an interiorly threaded nut permanently secured on the inner face of the bottom of said vessel in the centre thereof, a screw threading through said nut and extending through said bottom and said base and extending upwardly into said vessel, a nut threading on to the lower end of said screw into engagement with said base, a cover slidable on said screw, and a nut operating on said screw above said cover.

ANNA S. CHARLEBOIS.